June 30, 1953 B. EVANOFF 2,643,553

CHAIN SAW SHARPENING DEVICE

Filed Feb. 2, 1952 2 Sheets-Sheet 1

INVENTOR.
BOREECE EVANOFF
BY

June 30, 1953   B. EVANOFF   2,643,553
CHAIN SAW SHARPENING DEVICE
Filed Feb. 2, 1952   2 Sheets-Sheet 2
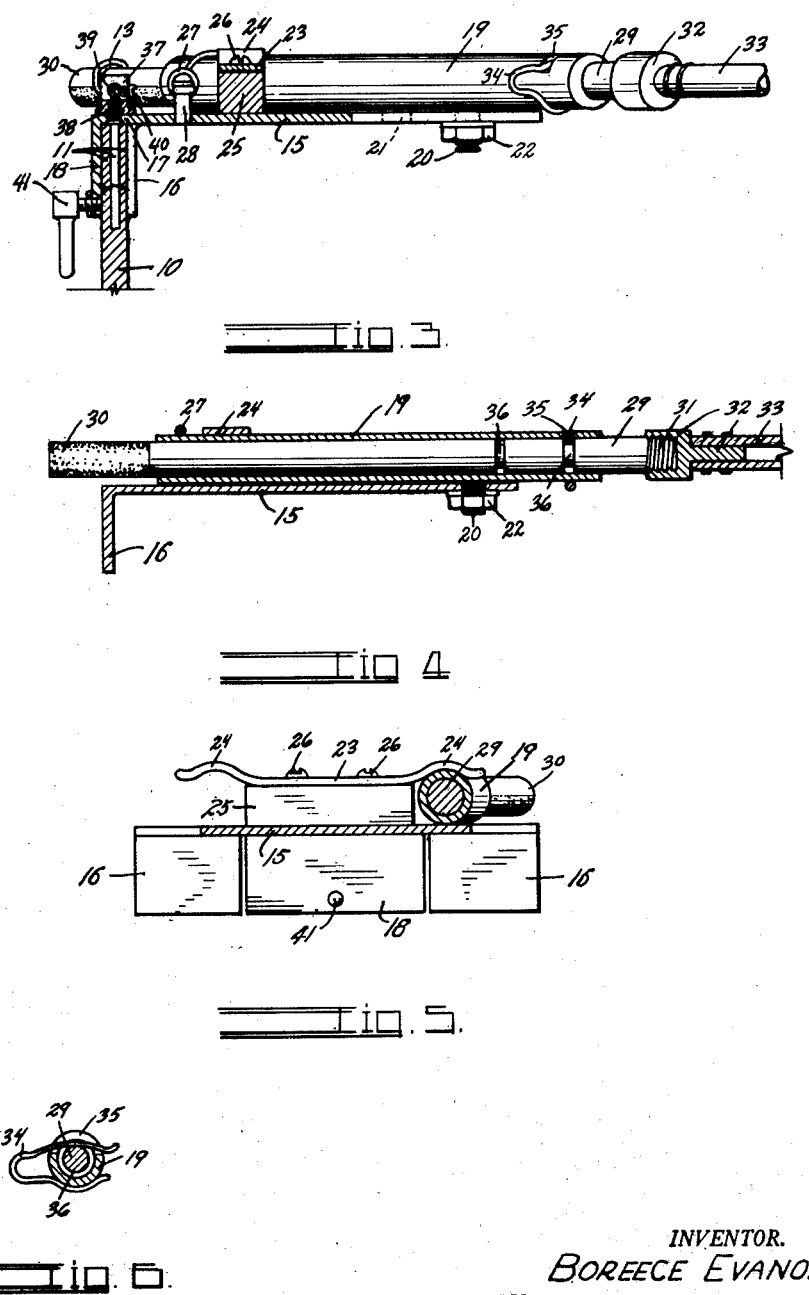
INVENTOR.
BOREECE EVANOFF
BY
ATTORNEY Patented June 30, 1953

2,643,553

UNITED STATES PATENT OFFICE 2,643,553

CHAIN SAW SHARPENING DEVICE

Boreece Evanoff, Oak Creek, Colo.

Application February 2, 1952, Serial No. 269,662

5 Claims. (Cl. 76—37)

This invention relates to a tooth-sharpening device for chain saws, and has for its principal object the provision of a simple, easily used, portable device by means of which the teeth of a conventional chain saw may be quickly, easily, and accurately sharpened.

Another object is to so construct the device that it can be used with any type of power available, and which, if necessary, can be used for hand sharpening.

A further object is to provide a gauge means for saw sharpening devices which sharpen alternating right and left-hand saw teeth at the proper cutting angle for highly efficient sawing uses.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Fig. 3 is a longitudinal section through the improved sharpener, taken on the line 3—3, Fig. 1;

Fig. 4 is a detail section, taken on the line 4—4, Fig. 1, illustrating an abrasive arbor employed in the improved sharpening device;

Fig. 5 is a cross-section, taken on the line 5—5, Fig. 1; and

Fig. 6 is a detail section, taken on the line 6—6, Fig. 1.

Figure 1:
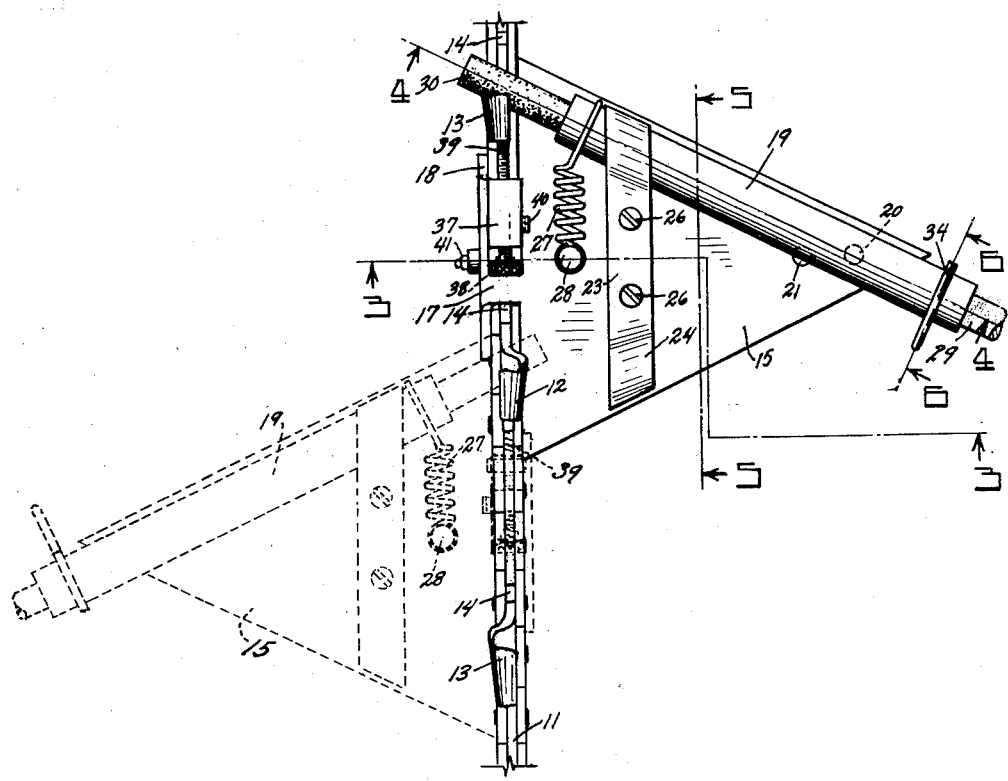
Fig. 1 is a top plan view of the improved saw sharpening device, illustrating it in two different positions upon the blade of a conventional chain saw.
Figure 2:
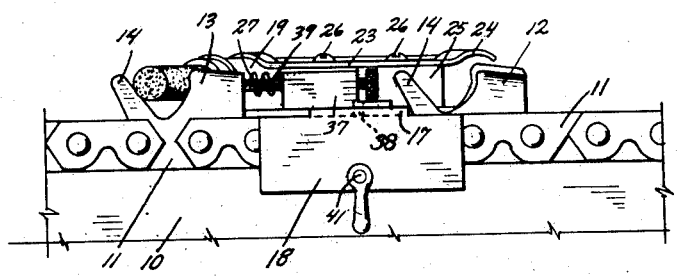
Fig. 2 is a front view thereof in place on the chain saw.

In the drawing the blade plate of a conventional chain saw is indicated at 10 having the usual edge groove for guiding the links of a conventional saw chain 11, from which right-hand saw teeth 12 and left-hand saw teeth 13 alternately project. Raker teeth 14 project from the chain intermediate the right and left-hand saw teeth 12 and 13.

The improved saw sharpening device employs a triangular gauge plate 15, the front or base edge of which is cut and folded downwardly adjacent the diagonal sides of the gauge plate 15 to form two rear flange plates 16. A T-shaped neck portion 17 is formed on the gauge plate 15 intermediate the two rear flange plates 16 and extends forwardly of the latter. The T-head on the T-shaped neck portion is folded downwardly at right angles to the plate 15 parallel to and spaced from the flange plates 16 to form a front flange plate 18.

The gauge plate 15 is designed to support an elongated mandrel bearing tube 19 provided with a threaded pivot stud 20 which extends downwardly through any desired one of a plurality of pivot holes 21, which are formed in the gauge plate 15 on the center line and adjacent the apex thereof. The pivot stud 20 is secured in place by means of a suitable retaining nut 22. The bearing tube 19 can be swung about the axis of the stud 20 to positions substantially parallel to the two inclined side edges of the triangular gauge plate 15.

The tube 19 is held in either of its angular positions by means of a leaf-type retaining spring 23 having arcuately bent extremities 24 beneath which the bearing tube snaps into position. The leaf spring 23 is mounted on a spacing block 25 of predetermined length. The spring and block are secured on the gauge plate 15 in any desired manner, such as by means of suitable mounting screws 26. The bearing tube 19 is constantly urged toward the spacing block 25 by means of a tension spring 27, one extremity of which is hooked about the tube 19, and the other extremity of which is mounted on a spring stud 28 projecting upwardly from the plate 15.

A mandrel 29 extends throughout the length of the tube 19 and is rotatable therein. One extremity of the mandrel is provided with an abrasive cylinder or round file 30. The other extremity is threaded, as shown at 31, or otherwise arranged to receive a coupling 32 of a flexible shaft 33, as is usual in flexible shaft constructions. The mandrel 29 is prevented from moving endwise in the tube 19 by means of a U-shaped spring clip 34 which extends through a notch 35 in top of the tube 19 to engage in either one of two circumferential grooves 36 formed in the mandrel.

An adjusting screw block 37 is mounted on a pivot stud 38 positioned in the neck portion 17 of the gauge plate. An adjusting screw 39 extends longitudinally through the block 37 and may be locked in any desired position therein by means of a set screw 40. The device may be, if desired, securely locked to the chain saw and blade plate 10 by means of a clamp screw 41 mounted on the front flange plate 18 and adapted to clamp against the blade plate 10. The flexible shaft 33 may be rotated by hand or may be connected to any suitable power source.

In use, the neck portion 17 of the gauge plate is placed over the chain saw 11, with the rear flange plates engaging one face of the chain and the blade plate 10, and the front flange plate 18 engaging the opposite face of the chain and blade plate. Let us assume that the gauge plate is positioned on the right side of the saw between one of the left-hand teeth 13 and one of the raker teeth 14, as shown in solid line in Fig. 1. The adjusting screw 39 bears against the back of the tooth 13, and this screw is adjusted so as to bring the round file 30 lightly against the tooth 13 and to force the bearing tube against the action of the spring 27 and slightly away from the spacer block 25. The adjusting screw 39 is now locked in the adjusted position and rotation is imparted to the mandrel 29 and file 30 to grind away the cutting face of the tooth on an angle corresponding to the angle of the bearing tube 19.

The grinding continues until the bearing tube 19 comes into contact with the spacer block, which prevents the spring 27 from imparting further angular movement to the bearing tube. The gauge plate is then moved successively rearwardly of each left-hand tooth until all of the latter teeth have been sharpened upon a common uniform angle.

The gauge plate 15 is now moved to a position on the left-hand side of the chain saw, as shown in broken line in Fig. 1, so as to be positioned rearwardly of the right-hand teeth thereon. The adjusting screw block 37 is rotated 180° about its pivot stud 38 so that the adjusting screw 39 will contact the back of the right-hand teeth 12, and the bearing tube is swung around its pivot stud 20 to the opposite side of the gauge plate and under the opposite side of the gauge plate and under the opposite extremity of the leaf spring 23, where it will be acted upon by the spring 27, as shown in broken line in Fig. 1. The file 30 is now rotated to sharpen the entering edge of the right-hand tooth 12 and is moved from tooth to tooth until all of the right-hand teeth have been sharpened.

It will be noted that the amount of grinding is limited by the position of the adjusting screw 39, as this regulates the position of the saw blade in the device. When the adjusting screw is once set, the angle of cut and the amount of metal removed on all teeth will be uniform so as to produce a sharp, rapid sawing action.

The angle at which the teeth are ground may be increased, if desired, by moving the stud 20 of the bearing tube to one of the holes 21 closer to the saw, and the round file can be retracted into the bearing tube to accommodate the closer position by releasing the spring clip 34 and moving the mandrel outwardly until the clip may be re-engaged in the closer circumferential groove 35.

The device may be used as a gauge for hand sharpening by simply removing the flexible shaft and the spring clip. The mandrel may then be reciprocated by hand to cause the round file to sharpen the teeth on the proper angle.

While a specific form of the improvement has been described and illustrated herein, it is to be understood that the same may be varied, within the scope of the appended claims, without departing from the spirit of the invention.

Having thus described the invention, what is claimed and described secured by Letters Patent is:

1. A saw sharpening device comprising: a gauge plate; an inside flange extending downwardly from said gauge plate to engage one side of said saw; an outside flange extending downwardly from said gauge plate to engage the other side of said saw; an adjusting screw mounted on said gauge plate over said saw and positioned to engage a tooth of the latter; a rotary saw sharpening member pivotally mounted on said gauge plate and adapted to engage the other side of said tooth; a spacing member mounted on said gauge plate; a spring urging said sharpening member toward said spacing member; and a leaf spring mounted on said spacing member and resiliently engaging said sharpening member for retaining the latter in place.

2. A saw sharpening device as described in claim 1 in which the leaf spring projects oppositely outward from both extremities of the spacing member so as to engage said sharpening device when the latter is swung to either side of said gauge plate.

3. A saw sharpening device as described in claim 2 in which the sharpening member comprises an elongated tubular bearing; a pivot stud projecting downwardly from said bearing through a pivot hole in said gauge plate; a mandrel rotatably mounted in said bearing; a cylindrical abrasive member on the forward extremity of said mandrel positioned to engage said tooth; and means for rotating said mandrel.

4. A saw sharpening device as described in claim 3 having a plurality of spaced-apart, circumferential grooves formed in said mandrel; and a resilient U-shaped retainer positioned exteriorly of said tubular bearing and engaging in a selected one of said grooves through an opening in said bearing.

5. A chain saw sharpening device comprising: a base plate; means for attaching said base plate to said saw so that it will project in a plane at right angles to the plane of said saw adjacent the teeth thereof; a tubular bearing member; a pivot stud projecting downwardly from said bearing member through a pivot hole in said gauge plate; an adjusting screw block; an adjusting screw threaded through said block and positioned to engage one side of a tooth of said saw; a rotatable mandrel in said bearing member; a cylindrical abrasive member on the extremity of said mandrel positioned to engage the other side of said tooth; spring means urging said abrasive member toward said tooth; and stop means positioned to stop the movement of said bearing member at a predetermined point, said bearing member being movable to either side of said gauge plate, and said adjusting screw block being rotatable on and in the plane of said plate so that the adjusting screw may contact a tooth at either side of said block.

BOREECE EVANOFF.

References Cited in the file of this patent

UNITED STATES PATENTS

| Number | Name | Date |
|---|---|---|
| 181,795 | McSweeny | Sept. 5, 1876 |
| 1,146,705 | Henry | July 13, 1915 |
| 1,557,494 | Glang | Oct. 13, 1925 |
| 2,458,058 | Carrol | Jan. 4, 1949 |
| 2,490,244 | Wahlstrom | Dec. 6, 1949 |
| 2,568,062 | Fitch | Sept. 18, 1951 |
| 2,589,165 | Toy et al. | Mar. 11, 1952 |

FOREIGN PATENTS

| Number | Country | Date |
|---|---|---|
| 670,747 | Germany | Jan. 26, 1939 |